(12) United States Patent
Sirop et al.

(10) Patent No.: US 12,180,869 B2
(45) Date of Patent: Dec. 31, 2024

(54) METHOD FOR IDENTIFYING DEFECTIVE INJECTION OF UREA INTO A VEHICLE EXHAUST LINE

(71) Applicant: Vitesco Technologies GmbH, Regensburg (DE)

(72) Inventors: Sylvain Sirop, Toulouse (FR); Stéphan Vales, Toulouse (FR)

(73) Assignee: VITESCO TECHNOLOGIES GBMH, Regensburg (DE)

( * ) Notice: Subject to any disclaimer, the term of this patent is extended or adjusted under 35 U.S.C. 154(b) by 0 days.

(21) Appl. No.: 18/562,050

(22) PCT Filed: May 11, 2022

(86) PCT No.: PCT/EP2022/062721
§ 371 (c)(1),
(2) Date: Nov. 17, 2023

(87) PCT Pub. No.: WO2022/243122
PCT Pub. Date: Nov. 24, 2022

(65) Prior Publication Data
US 2024/0229698 A1    Jul. 11, 2024

(30) Foreign Application Priority Data

May 21, 2021   (FR) ...................................... 2105331

(51) Int. Cl.
*F01N 11/00*    (2006.01)
*F01N 3/20*    (2006.01)
(52) U.S. Cl.
CPC ............ *F01N 11/00* (2013.01); *F01N 3/2066* (2013.01); *F01N 3/208* (2013.01);
(Continued)

(58) Field of Classification Search
CPC ........ F01N 11/00; F01N 3/2066; F01N 3/208; F01N 2550/05; F01N 2610/02;
(Continued)

(56) References Cited

U.S. PATENT DOCUMENTS

2010/0005871 A1   1/2010  Kitazawa
2011/0107742 A1   5/2011  Igarashi et al.
(Continued)

FOREIGN PATENT DOCUMENTS

EP    3469197 B1    4/2019
IN    201941025335 A    1/2021
(Continued)

OTHER PUBLICATIONS

International Search Report and Written Opinion for International Application No. PCT/EP2022/062721, mailed Sep. 19, 2022, 14 pages.
(Continued)

*Primary Examiner* — Brandon D Lee
(74) *Attorney, Agent, or Firm* — Buchanan, Ingersoll & Rooney PC

(57) ABSTRACT

A method for identifying a fault in the injection of urea into an exhaust line of a vehicle fitted with an internal combustion engine, the method having the following steps: calculating a ratio between a measured filling time and a flushing time of a urea line, the calculation being carried out by a urea injection control unit; comparing the calculated ratio to a reference ratio by the urea injection control unit; if the calculated ratio is different than the reference ratio, identifying a urea injection fault in the urea line by the urea injection control unit.

10 Claims, 4 Drawing Sheets

(52) U.S. Cl.
CPC ...... *F01N 2550/05* (2013.01); *F01N 2610/02* (2013.01); *F01N 2610/1453* (2013.01); *F01N 2610/1493* (2013.01); *F01N 2900/0422* (2013.01); *F01N 2900/08* (2013.01); *F01N 2900/1806* (2013.01); *F01N 2900/1808* (2013.01); *F01N 2900/1822* (2013.01)

(58) Field of Classification Search
CPC ..... F01N 2610/1453; F01N 2610/1493; F01N 2900/0422; F01N 2900/08; F01N 2900/1806; F01N 2900/1808; F01N 2900/1822; Y02T 10/12
See application file for complete search history.

(56) References Cited

U.S. PATENT DOCUMENTS

2013/0213014 A1\* 8/2013 Ohno .................. F01N 3/2066
60/277
2013/0283771 A1 10/2013 Nagata

FOREIGN PATENT DOCUMENTS

| JP | 2008223770 A | 9/2008 |
| JP | 2011149365 A | 8/2011 |
| JP | 2011149366 A | 8/2011 |
| JP | 2013234603 A | 11/2013 |
| JP | 2015151978 A | 8/2015 |
| JP | 2016205363 A | 12/2016 |

OTHER PUBLICATIONS

International Search Report and Written Opinion for International Application No. PCT/EP2022/062721, mailed Sep. 19, 2022, 16 pages (French).

\* cited by examiner

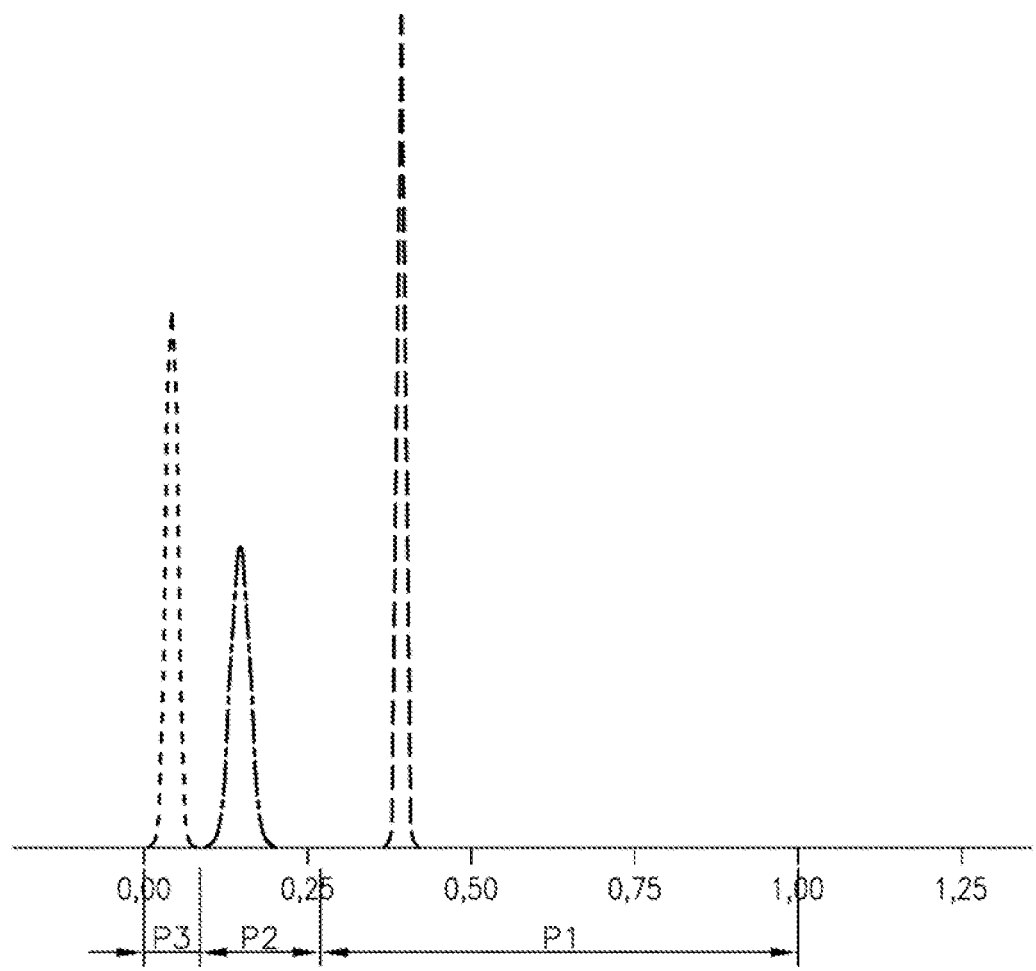

METHOD FOR IDENTIFYING DEFECTIVE INJECTION OF UREA INTO A VEHICLE EXHAUST LINE

CROSS REFERENCE TO RELATED APPLICATIONS

This application is the U.S. National Phase Application of PCT International Application No. PCT/EP2022/062721, filed May 11, 2022, which claims priority to French Patent Application No. 2105331, filed May 21, 2021, the contents of such applications being incorporated by reference herein.

FIELD OF THE INVENTION

The technical field of the invention is that of vehicles provided with an internal combustion engine and a urea line interacting with an exhaust line to limit the polluting emissions of this engine.

BACKGROUND OF THE INVENTION

Vehicles fitted with an internal combustion engine and a urea line designed and arranged to inject urea into an exhaust line are known.

The aqueous solution of urea known under the reference AUS32 can be cited, for example. It is an aqueous solution of urea in a 32.5% dilution. This urea, converted to ammonia, is then used in the exhaust line to perform selective catalytic reduction (known by the abbreviation SCR). The ammonia then makes it possible to reduce components of the NOx type present in the exhaust gases into nitrogen and water.

FIG. 1 shows a vehicle 1 having a urea line 2 and an exhaust line 3 according to the prior art.

More particularly, the exhaust line 3 has a first catalytic converter 4 for the exhaust gases that is disposed downstream of the internal combustion engine 5, and a second catalytic converter 6 for the exhaust gases of SCR type that is associated with a particulate filter and is disposed downstream of the first catalytic converter 4. The exhaust line 3 moreover has a third catalytic converter 7 for the exhaust gases of SCR type that is disposed downstream of the second catalytic converter 6 for the exhaust gases.

The urea line 2, for its part, has a first injector 8 connected upstream of the second catalytic converter 6 for the exhaust gases and a second injector 9 connected upstream of the third catalytic converter 7 for the exhaust gases. The urea line 2 also has a three-way connector 10 connecting the first injector 8 and the second injector 9 to a pump connector 11.

The pump connector 11 is used to connect the urea line 2 to a pump 12. The pump 12 also interacts with a urea reservoir 13 and is able to make urea flow in the urea line 2.

It should be noted that the pump 12 is designed and arranged to operate in two directions of rotation. Thus, in one direction of rotation, the pump 12 forces the urea into the exhaust line 3, in the example illustrated at the first injector 8 and the second injector 9. The injection of urea into the exhaust line 3 makes it possible to limit the polluting emissions from the engine 5.

In the other direction of rotation, the pump 12 is used to flush the urea line 2. Specifically, such flushing of the urea line 2 is necessary when the vehicle is at a standstill in order to protect the components, notably the injectors 8, 9 and the connectors 10, 11 of the urea line, from deterioration that can be caused by negative temperatures, for example about −11° C.

If a plug of ice forms in the exhaust line or if the urea line 2 has a constriction, urea cannot be injected into the exhaust line suitably. The same applies if an opening is created in the urea line 2, for example owing to deterioration of one of the connectors 10, 11.

To detect a constriction or an opening in the urea line 2, an operator needs to visually inspect the urea line 2.

If the fault is not visible, in other words if there is a plug of ice, the operator must act on the urea line 2 by means, for example, of thermocouple probes. These solutions are clearly complex to implement.

SUMMARY OF THE INVENTION

An aspect of the invention aims to offer a solution to the aforementioned problems and notably makes it possible to easily identify a deflective injection of urea into an exhaust line of a vehicle.

In this context, an aspect of the invention thus relates, in its broadest sense, to a method for identifying a fault in the injection of urea into an exhaust line of a vehicle fitted with an internal combustion engine, the method having the following steps:

flushing a urea line by means of a pump connected to the urea line, the pump operating at a constant determined rotational speed;

filling the urea line by means of the pump, the pump operating at said constant determined rotational speed;

measuring a filling time of said urea line, the filling time being formed by a time needed to reach a predetermined maximum pressure in the urea line; the measurement being taken by means of a urea injection control unit;

calculating a ratio between the measured filling time and a flushing time of the urea line, the calculation being carried out by means of the urea injection control unit, comparing the calculated ratio to a reference ratio by means of the urea injection control unit, if the calculated ratio is different than the reference ratio, identifying and providing information about a urea injection fault in the urea line by means of the urea injection control unit.

By virtue of this aspect of the invention, it is possible to easily identify a urea injection fault in the exhaust line, notably by means of the urea injection control unit, without it being necessary to carry out a visual inspection or to act on the urea line with any sort of thermocouple probe. Information about this fault can be provided by any means, for example by lighting up an indicator light or by displaying information relating to this fault on the dashboard or on any other suitable medium, or by storing information relating to this fault in a computer memory in order to be viewed on a control apparatus after connection to said computer or any other device connected to the computer.

In addition to the features which have just been mentioned in the previous paragraph, the method for identifying a fault in the injection of urea into an exhaust line of a vehicle according to one aspect of the invention may have one or more of the following additional features, considered individually or in any technically possible combination.

According to a non-limiting aspect of the invention, the calculated ratio is equal to the measured filling time divided by the flushing time, if the calculated ratio is greater than the reference ratio, the urea injection fault identified is caused by an opening present in the urea line or by an operating fault of the pump;

if the calculated ratio is less than the reference ratio, the urea injection fault identified is caused by an obstruction present in the urea line.

As a result, by virtue of this aspect of the invention, it is possible to identify the type of urea injection fault, whether obstruction or opening, that is present in the urea line. This aspect of the invention makes it a lot easier to perform maintenance on the urea line.

According to a non-limiting aspect of the invention, the calculated ratio is equal to the flushing time divided by the measured filling time,
  if the calculated ratio is greater than the reference ratio, the urea injection fault identified is caused by an obstruction present in the urea line,
  if the calculated ratio is less than the reference ratio, the urea injection fault identified is caused by an opening present in the urea line or by an operating fault of the pump.

As a result, by virtue of this aspect of the invention, it is possible to identify the type of urea injection fault, whether obstruction or opening, that is present in the urea line. This aspect of the invention makes it a lot easier to perform maintenance on the urea line.

According to a non-limiting aspect of the invention, if the urea injection fault identified is caused by an obstruction present in the urea line, the method has a step consisting in locating the urea injection fault by means of the urea injection control unit, multiple reference ratios being predefined, each of the reference ratios forming a limit of a range of values so as to form a plurality of ranges of values, each of the ranges of values being associated with a zone of the urea line, the location corresponding to a zone of the urea line that is associated with the range of values covering the calculated ratio.

As a result, by virtue of this aspect of the invention, since the zone of the urea line that has an obstruction is known, it becomes much easier to perform maintenance on the urea line. It is not necessary to carry out a visual inspection, or even to act on the urea line for that matter.

According to a non-limiting aspect of the invention, at least one of the ranges of values is associated with a zone of the urea line that has:
  a first connector connecting the pump to one end of a first duct;
  a second connector connecting the other end of said first duct to one end of a second duct;
  an injector connector connecting the other end of said second duct to at least one first injector or second injector;
  a first injector connected to the injector connector;
  a second injector connected to the injector connector.

According to a non-limiting aspect of the invention, the method has a step consisting in measuring a flushing time of the urea line, said measurement being taken by means of the urea injection control unit.

According to a non-limiting aspect of the invention, the steps of flushing the urea line and of measuring the flushing time of the urea line are carried out when the internal combustion engine of the vehicle is switched off.

According to another aspect, the invention relates to a urea injection control unit designed and arranged to implement the steps of the method for identifying a fault in the injection of urea into an exhaust line according to any one of the aforementioned aspects of the invention.

According to a different aspect, the invention relates to a vehicle having:
  an internal combustion engine;
  an exhaust line connected to the internal combustion engine;
  a pump;
  a urea line connected to said pump; the urea line having at least one injector designed and arranged to inject urea into the exhaust line;
  a urea injection control unit designed and arranged to implement the steps of the method for identifying a fault in the injection of urea into an exhaust line according to any one of the aforementioned aspects of the invention.

According to a non-limiting aspect of the invention, the exhaust line has a first catalytic converter for reducing pollutants in the exhaust gases and a second catalytic converter for reducing pollutants in the exhaust gases. The urea line has a first injector and a second injector, the first injector being connected upstream of the first catalytic converter for reducing pollutants in the exhaust gases and the second injector being connected upstream of the second catalytic converter for reducing pollutants in the exhaust gases.

Aspects of the invention and its various applications will be understood better from reading the following description and studying the accompanying figures.

BRIEF DESCRIPTION OF THE FIGURES

The figures are presented by way of indication and in no way limit the invention.

FIG. 7 schematically illustrates locations of urea injection faults according to a non-limiting aspect of the invention.

DETAILED DESCRIPTION OF THE PREFERRED EMBODIMENTS

Unless indicated otherwise, an element that is the same and appears in the different figures has a single reference.

Figure 1:
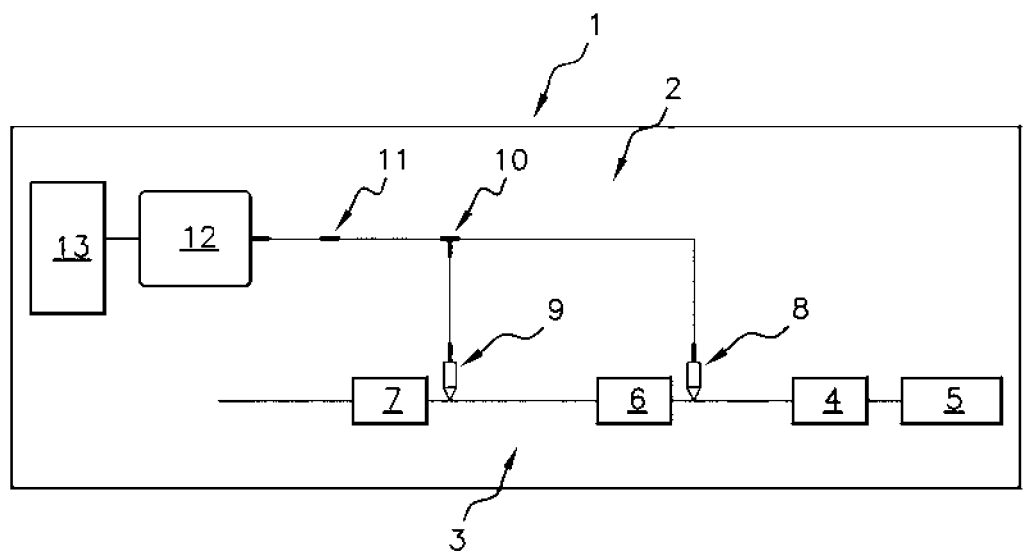
FIG. 1 schematically illustrates a vehicle having a urea line and an exhaust line according to the prior art.
Figure 2:
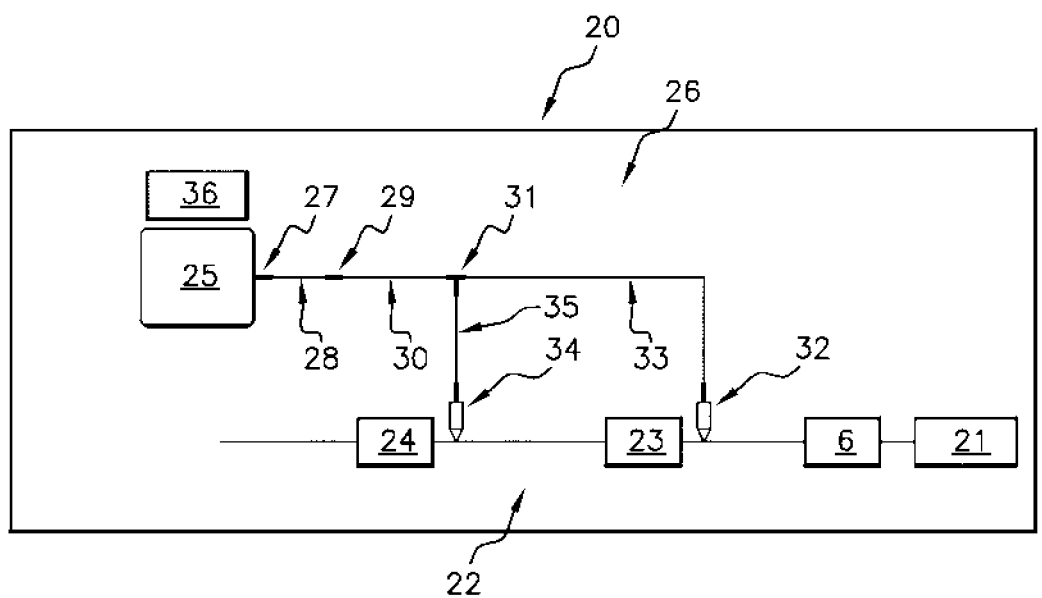
FIG. 2 schematically illustrates a vehicle provided with an internal combustion engine according to a non-limiting aspect of the invention.
Figure 3:
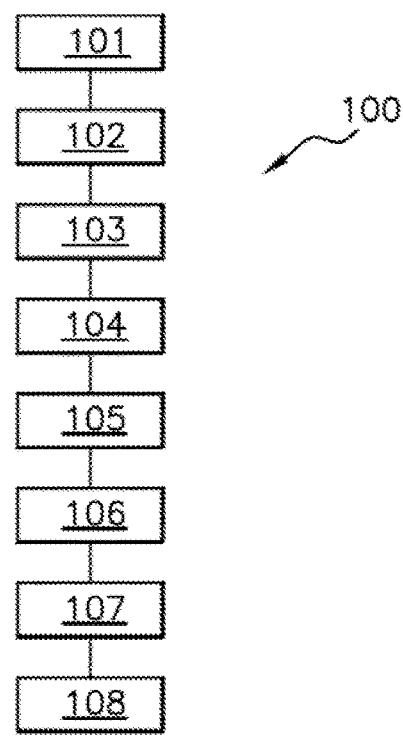
FIG. 3 illustrates a method for identifying a fault in the injection of urea into an exhaust line of a vehicle according to a non-limiting aspect of the invention.

FIG. 2 illustrates an exemplary embodiment of a vehicle 20 according to a non-limiting aspect of the invention, in which a method 100 for identifying a fault in the injection of urea into an exhaust line according to one aspect of the invention illustrated in FIG. 3 is implemented.

The vehicle 20 notably has an internal combustion engine 21.

The vehicle 20 also has an exhaust line 22 connected to the internal combustion engine 21.

The exhaust line 22 has a first catalytic converter 23 for reducing pollutants in the exhaust gases and a second catalytic converter 24 for reducing pollutants in the exhaust gases.

The vehicle 20 moreover has a pump 25 designed and arranged to operate in two directions of rotation.

The vehicle 20 also has a urea line 26 connected to the pump 25.

In this non-limiting embodiment, the urea line 26 has:
- a first connector 27 connecting the pump 25 to one end of a first duct 28;
- a second connector 29 connecting the other end of the first duct 28 to one end of a second duct 30;
- an injector connector 31 connecting the other end of the second duct 30 to a first injector and to a second injector;
- a first injector 32 connected to the injector connector 31 via a third duct 33;
- a second injector 34 connected to the injector connector 31 via a fourth duct 35.

The first injector 32 is connected upstream of the first catalytic converter 23 for reducing pollutants in the exhaust gases and the second injector 34 is connected upstream of the second catalytic converter 24 for reducing pollutants in the exhaust gases.

The vehicle 20 also has a urea injection control unit 36 designed and arranged to implement the steps of the method for identifying a fault in the injection of urea into an exhaust line according to a non-limiting aspect of the invention illustrated in FIG. 3.

FIG. 3 schematically illustrates a non-limiting example for implementing a method 100 for identifying a fault in the injection of urea into an exhaust line of a vehicle according to that illustrated in FIG. 2.

The method 100 has a step consisting in flushing 101 the urea line 26 by means of the pump 25 when the internal combustion engine is switched off. Controlling the pump 25 in a direction of rotation by means of the urea injection control unit 36 makes it possible to generate a negative pressure in the urea line 26 so as to at least partially empty the latter, notably the first and second injectors 32, 34.

During this step consisting in purging 101, the pump 25 operates at a constant determined rotational speed.

Figure 4:
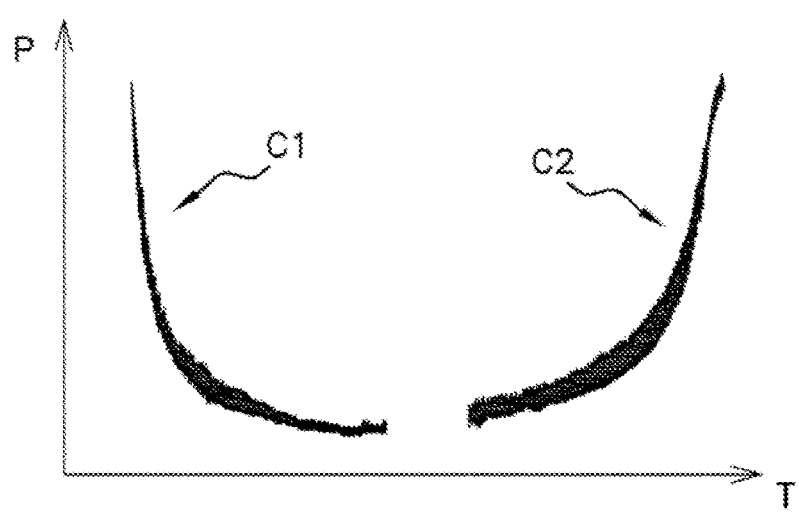
FIG. 4 shows two curves illustrating a step consisting in flushing and a step consisting in filling according to a non-limiting aspect of the invention.
Figure 4:
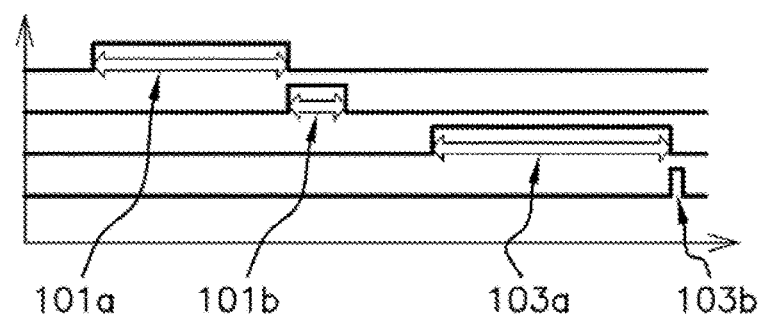

The step consisting in purging 101 the urea line may have two phases 101a, 101b illustrated in FIG. 4. More particularly, this figure shows a first curve C1, which is formed by the pressure P as a function of time T and illustrates the flushing of the urea line 26. Below this first curve C1, the following are illustrated:
- a first phase 101a during which the urea line 26 is depressurized, starting from the nominal operating point and ranging up to a calibrated depression point;
- a second phase 101b constituted of a calibrated opening time of the first and second injectors 32, 34.

The method 100 has a step consisting in measuring 102 the flushing time of the urea line 26 when the internal combustion engine is switched off, the flushing time of the urea line 26 being formed in this example by the time needed to carry out the first phase 101a and the second phase 101b. The measurement is taken by means of the urea injection control unit 36.

In an embodiment which is not illustrated, the flushing time is predetermined such that it is not necessary to measure the time needed to flush the urea line 36.

The method 100 moreover has a step consisting in filling 103 the urea line 26 by means of the pump 25. Controlling the pump 25 in an opposite direction of rotation by means of the urea injection control unit 36 makes it possible to generate a pressure in the urea line 26.

It should be noted that, during the step consisting in filling 103, the pump 25 operates at the constant determined rotational speed. This constant determined rotational speed is identical to that implemented during the previous step consisting in purging 101.

The step consisting in filling 103 the urea line 26 may have two phases 103a, 103b illustrated in FIG. 4. More particularly, this figure shows a second curve C2, which is formed by the pressure P as a function of time T and illustrates the filling of the urea line 26. Below this second curve C2, the following are illustrated:
- a first phase 103a during which the urea line is pressurized with a maximum rotational speed of the pump 25;
- a second phase 103b during which the rotational speed of the pump 25 is reduced until a predetermined maximum pressure is reached, but without exceeding it. In this embodiment, during the second phase 103b, the rotational speed of the pump 25 is decreased. As the time of this second phase 103b represents approximately 2% of the overall time for filling the urea line 26, the time of this second phase 103b is negligible, such that it is possible to consider the rotational speed of the pump as constant.

The method 100 moreover has a step consisting in measuring 104 a time of filling the urea line 26. The filling time is formed by a time needed to reach a predetermined maximum pressure in the urea line 26. The measurement is taken by means of the urea injection control unit 36.

It should be noted that, if the urea line does not have an obstruction or an opening, as illustrated in FIG. 4, the time utilized to flush the urea line 26 is theoretically the same as that needed to fill it.

Figure 5:
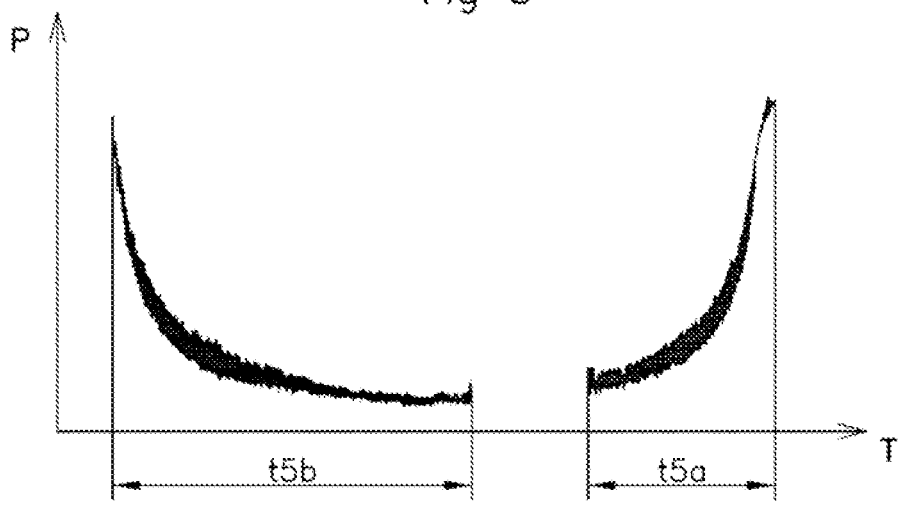
FIG. 5 shows two curves illustrating a step consisting in flushing and a step consisting in filling according to another non-limiting aspect of the invention.

In a different embodiment illustrated in FIG. 5, if the urea line 26 has an obstruction that may, for example, be formed by a constriction, a plug of ice or a crystallization of urea, the filling time t5a needed to reach a predetermined maximum pressure in the urea line 26 is shorter than the flushing time t5b needed for the flushing.

Figure 6:
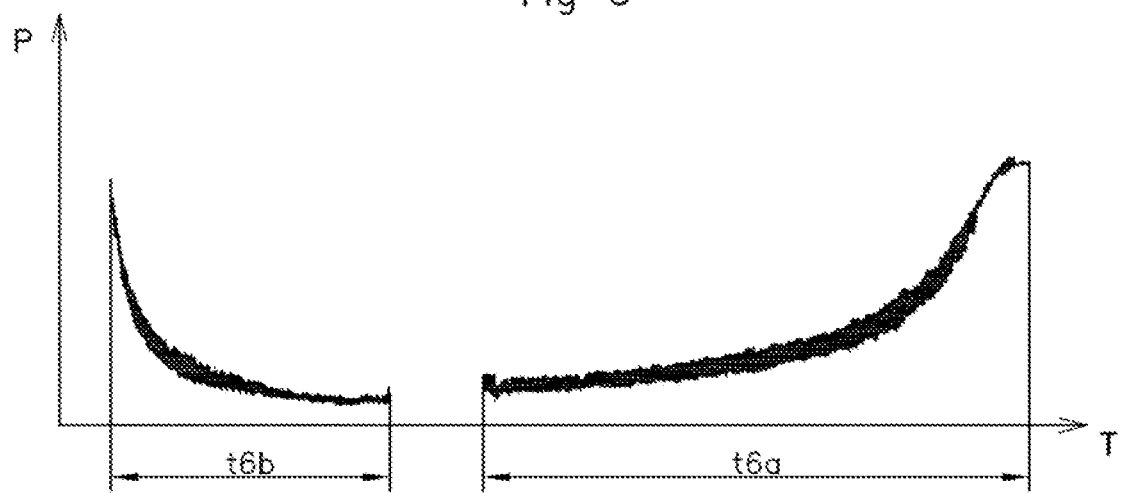
FIG. 6 shows two curves illustrating a step consisting in flushing and a step consisting in filling according to a different non-limiting aspect of the invention.

In yet another different embodiment illustrated in FIG. 6, if the urea line 26 has an opening that may, for example, be formed by the opening of one of the first and second injectors 32, 34, an orifice in the urea line 26 or an operating fault of the pump 25, the filling time t6a needed to reach a predetermined maximum pressure in the urea line 26 is longer than the flushing time t6b needed for the flushing.

The method 100 has a step consisting in calculating 105 a ratio between the measured filling time and the flushing time of the urea line 26.

In a non-limiting exemplary embodiment, the calculated ratio is equal to the measured filling time divided by the flushing time. The calculation is carried out by means of the urea injection control unit 36.

The method 100 has a step consisting in comparing 106 the calculated ratio to a reference ratio, for example equal to 1. This step consisting in comparing 106 is carried out by means of the urea injection control unit 36.

If the calculated ratio is different than the reference ratio, that is to say different than 1 in this example, the method 100 has a step consisting in identifying a urea injection fault in the urea line 26. This step consisting in identifying a urea injection fault is carried out by means of the urea injection control unit 36.

Specifically, in this example, if the measured flushing time and the measured filling time are equal, the ratio calculated during step 105 consisting in calculating a ratio will be equal to the reference ratio. This means that there is no injection fault in the urea line 26.

By contrast, if the measured flushing time and the measured filling time are different, the ratio calculated during step 105 consisting in calculating a ratio will be different than the reference ratio. This means that there is an injection fault in the urea line.

In this example, if the calculated ratio is greater than the reference ratio, in other words if the measured filling time is greater than the flushing time, the urea injection fault identified is caused by an opening present in the urea line 26 or by an operating fault of the pump 25.

Conversely, if the calculated ratio is less than the reference ratio, that is to say if the measured filling time is less than the flushing time, the urea injection fault identified is caused by an obstruction present in the urea line 26.

In a non-limiting embodiment, multiple reference ratios are predefined. In this example, two additional reference ratios are predefined. In this embodiment, three reference ratios are therefore present, for example:
- a first reference ratio equal to 1,
- a second reference ratio equal to 0.25, and
- a third reference ratio equal to 0.10.

As illustrated in FIG. 7, each of the reference ratios forms a limit of a range of values so as to together form a plurality of ranges of values. FIG. 7 notably illustrates ratios on the abscissa. In the example illustrated, the three reference ratios together delimit three ranges of values, specifically:
- a first range of values P1 comprises the first ratio and the second ratio, namely between 1 and 0.25;
- a second range of values P2 comprised between the second ratio and the third ratio, in other words between 0.25 and 0.10; and
- a third range of values P3 less than the third ratio, namely between 0.10 and 0.

The three ranges of values can be translated as follows: P3<P2<P1

It should be noted that each of the ranges of values P1, P2, P3 is associated with a different zone of the urea line 26. For example,
- the first range of values P1 is associated with a zone of the urea line 26 that has the second injector 34 connected upstream of the second catalytic converter 24 for the exhaust gases;
- the second range of values P2 is associated with a zone of the urea line 26 that has the first connector 27 connecting the pump 25 to one end of the first duct 28;
- the third range of values P3 is associated with a zone of the urea line 26 that has the second connector 29 connecting the other end of the first duct 28 to one end of the second duct 30.

If the urea injection fault identified is caused by an obstruction present in the urea line 26, the method 100 has a step consisting in locating 108 the urea injection fault, the location corresponding to a zone of the urea line 26 that is associated with the range of values P1, P2, P3 covering the calculated ratio. The step consisting in locating 108 the urea injection fault is carried out by means of the urea injection control unit 26.

FIG. 7 notably illustrates such an embodiment. If an obstruction arises in one of the ranges of values P1, P2, P3, a spike is produced such that it is possible to locate the obstruction depending on the location of the spike.

For example, in this non-limiting exemplary embodiment,
- when the calculated ratio is 0.4, an intensity spike is visible in the first range of values P1. This ratio consequently indicates that an obstruction is present in the corresponding zone of the urea line, namely the second injector 34 in this example,
- when the calculated ratio is 0.12, an intensity spike is visible in the second range of values P2. This ratio consequently indicates that an obstruction is present in the corresponding zone of the urea line, namely the first connector 27 connecting the pump 25 to the first duct 28 in this example,
- when the calculated ratio is 0.05, an intensity spike is visible in the third range of values P3. This ratio consequently indicates that an obstruction is present in the corresponding zone of the urea line, namely the second connector 29 connecting the first duct 28 to the second duct 30 in this example.

As a result, by virtue of an aspect of the invention, it is possible to identify a fault in the injection of urea into an exhaust line.

It is also possible to identify the type of fault, namely an obstruction or an opening.

In the case of an obstruction, it is moreover possible to locate the zone of the urea line that has an anomaly. This particular feature is particularly advantageous and makes it possible to facilitate the repair of the urea line by replacing the defective element.

Information about this fault in the injection of urea into an exhaust line can be provided by any means, for example and non-limitingly by lighting up an indicator light or by displaying information relating to this fault on the dashboard or on any other suitable medium, or by storing information relating to this fault in a computer memory in order to be viewed on a control apparatus after connection to said computer or any other device connected to the computer.

It goes without saying that the aspects of the invention that are presented above are not limiting. It is clear that a person skilled in the art is able to modify the number of injectors of the urea line, the number of predefined reference ratios, or else the extent of each of the ranges of values.

The invention claimed is:

1. A method for identifying a fault in an injection of urea into an exhaust line of a vehicle fitted with an internal combustion engine, the method comprising:
   flushing a urea line by a pump connected to said urea line, said pump operating at a constant determined rotational speed;
   filling said urea line by said pump, said pump operating at said constant determined rotational speed;
   measuring a filling time of said urea line, said filling time being formed by a time needed to reach a predetermined maximum pressure in said urea line; said measurement being taken by a urea injection control unit;
   calculating a ratio between said measured filling time and a flushing time of said urea line, said calculation being carried out by said urea injection control unit,
   comparing said calculated ratio to a reference ratio by said urea injection control unit,
   if said calculated ratio is different than said reference ratio, identifying and providing information about the urea injection fault in said urea line said urea injection control unit.

2. The method for identifying the urea injection fault as claimed in claim 1, wherein the calculated ratio is equal to the measured filling time divided by the flushing time,
   if said calculated ratio is greater than the reference ratio, the urea injection fault identified is caused by an opening present in the urea line or by an operating fault of the pump;

if said calculated ratio is less than the reference ratio, the urea injection fault identified is caused by an obstruction present in the urea line.

3. The method for identifying the urea injection fault as claimed in claim 1, wherein the calculated ratio is equal to the flushing time divided by the measured filling time,
   if said calculated ratio is greater than the reference ratio, the urea injection fault identified is caused by an obstruction present in the urea line;
   if said calculated ratio is less than the reference ratio, the urea injection fault identified is caused by an opening present in the urea line or by an operating fault of the pump.

4. The method for identifying the urea injection fault as claimed in claim 1, wherein if the urea injection fault identified is caused by an obstruction present in the urea line, the method has a step consisting in locating the urea injection fault by the urea injection control unit, multiple reference ratios being predefined, each of the reference ratios forming a limit of a range of values so as to form a plurality of ranges of values, each of the ranges of values being associated with a zone of the urea line, said location corresponding to the zone of the urea line that is associated with the range of values covering the calculated ratio.

5. The method for identifying the urea injection fault as claimed in claim 4, wherein at least one of the ranges of values is associated with the zone of the urea line having:
   a first connector connecting the pump to one end of a first duct;
   a second connector connecting an other end of said first duct to one end of a second duct;
   an injector connector connecting the other end of said second duct to at least one first injector or second injector;
   the first injector connected to said injector connector;
   the second injector connected to said injector connector.

6. The method for identifying the urea injection fault as claimed in claim 1, further comprising measuring the flushing time of the urea line, said measurement being taken by the urea injection control unit.

7. The method for identifying the urea injection fault as claimed in claim 6, wherein the steps consisting in the flushing of the urea line and in the measuring of the flushing time of the urea line are carried out when the internal combustion engine of the vehicle is switched off.

8. A urea injection control unit, wherein it is designed and arranged to implement the steps of the method for identifying a fault in the injection of urea into an exhaust line according to claim 1.

9. A vehicle having:
   an internal combustion engine;
   an exhaust line connected to said internal combustion engine;
   a pump;
   a urea line connected to said pump; said urea line having at least one injector designed and arranged to inject urea into said exhaust line;
   said vehicle having a urea injection control unit designed and arranged to implement the steps of the method for identifying a fault in the injection of urea into the exhaust line as claimed in claim 1.

10. The vehicle as claimed in claim 9, wherein the exhaust line has a first catalytic converter for reducing pollutants in the exhaust gases and a second catalytic converter for reducing pollutants in the exhaust gases, and the urea line has a first injector and a second injector, the first injector being connected upstream of the first catalytic converter for reducing pollutants in the exhaust gases and the second injector being connected upstream of the second catalytic converter for reducing pollutants in the exhaust gases.

* * * * *

UNITED STATES PATENT AND TRADEMARK OFFICE
CERTIFICATE OF CORRECTION

| | | |
|---|---|---|
| PATENT NO. | : 12,180,869 B2 | Page 1 of 1 |
| APPLICATION NO. | : 18/562050 | |
| DATED | : December 31, 2024 | |
| INVENTOR(S) | : Sylvain Sirop and Stéphan Vales | |

It is certified that error appears in the above-identified patent and that said Letters Patent is hereby corrected as shown below:

On the Title Page

Item (73) Assignees: Change "VITESCO TECHNOLOGIES GBMH" to -- VITESCO TECHNOLOGIES GMBH --.

In the Claims

In Column 8, Line 59 of Claim 1: after "line" insert -- by --.

In Column 10, Line 25 of Claim 9: delete "into the" and insert -- into said --.

Signed and Sealed this
Eighteenth Day of February, 2025

Coke Morgan Stewart
*Acting Director of the United States Patent and Trademark Office*